April 3, 1951  R. D. HENNIGAN  2,547,753
PEANUT CULTIVATOR

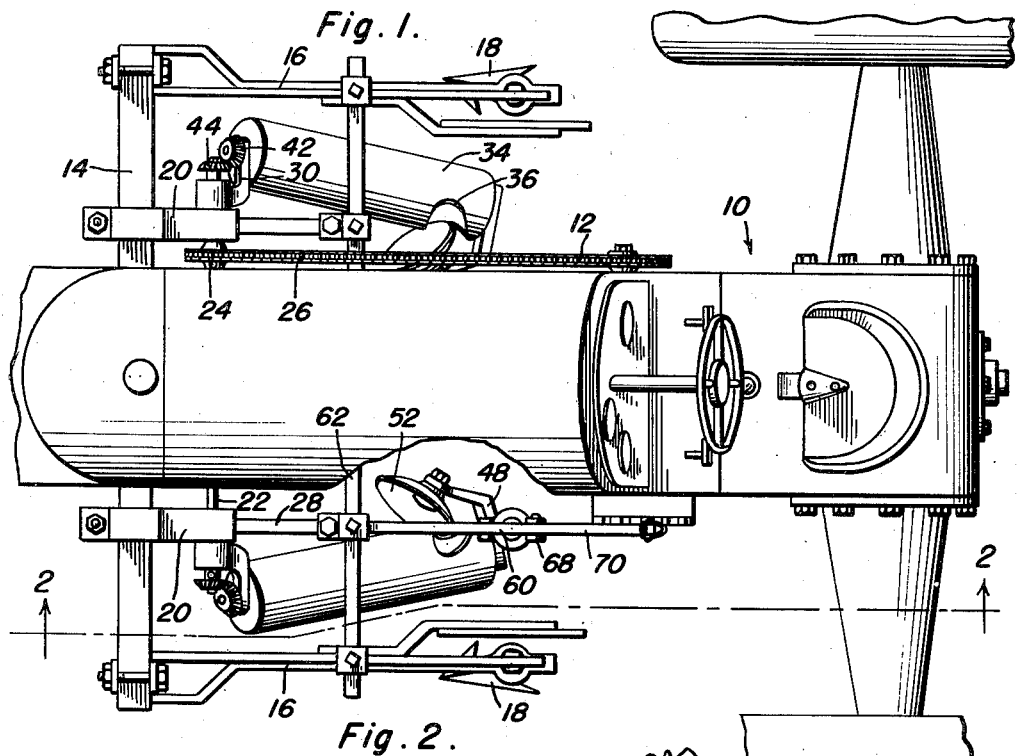

Filed March 3, 1949  2 Sheets-Sheet 2

Inventor
Richard D. Hennigan

By *Clarence A. O'Brien and Harvey B. Jacobson*
Attorneys

Patented Apr. 3, 1951

2,547,753

UNITED STATES PATENT OFFICE 2,547,753

PEANUT CULTIVATOR

Richard D. Hennigan, Calera, Okla.

Application March 3, 1949, Serial No. 79,421

4 Claims. (Cl. 97—10)

This invention comprises novel and useful improvements in a peanut cultivator and more specifically pertains to an agricultural cultivator having improved means for cultivating a crop row, and for directing and moving top soil about a crop row undergoing cultivation.

The principal object of this invention is to provide an improved cultivator particularly adapted for cultivating peanuts and similar crops, and wherein an improved cultivation of a crop row or rows is effected by supplementing the customary action of cultivator blades for working the crop row, by additionally moving top soil from between the rows and about the crop row or rows for cultivating the same.

A further important object of the invention is to provide a cultivating device in the form of an attachment which may be readily applied to existing agricultural cultivators for improving cultivating action thereof for row crops.

A still further object of the invention is to provide an attachment as set forth in the preceding object wherein a power operating means for the attachment is provided which may conveniently comprise the power take-off of a tractor or the like, and wherein additional soil is directed to the crop rows and is taken from top soil between or adjacent the rows undergoing cultivation.

A further feature of the invention resides in the provision of an improved construction of attachment which may be readily applied to or if desired, may be conveniently built into the construction of an agricultural cultivator, and wherein the advantages of a spiral screw-type of elevator are employed for moving top soil and directing the same against the crop row undergoing cultivation.

A still further feature of the invention resides in the provision of a device as set forth in the foregoing objects and features, wherein improved and highly effective means are provided for adjusting the inclination, direction and operation of the elevator, whereby the device may be readily adapted for use with different crops having different row spacings.

The final important feature and object of the invention to be specifically enumerated, contemplates the provision of a device as set forth in the preceding features and objects, wherein the elevating means is pivotally mounted and supported by the driving mechanism of the elevators; and wherein the elevators are further provided with soil breaking means for directing top soil into the intake openings of the elevator.

These, together with various ancillary features and objects of the invention, which later will become apparent as the following description proceeds, are attained by this device, a preferred embodiment which has been illustrated by way of example only in the accompanying drawings, wherein:

Figure 1 is a top plan view of an agricultural tractor cultivator showing the improved cultivating attachment in accordance with the principles of this invention applied thereto;

Figure 2 is a fragmentary side elevational view of the arrangement of Figure 1, taken substantially on the vertical plane of the sectional line 2—2 of Figure 1;

Figure 3:
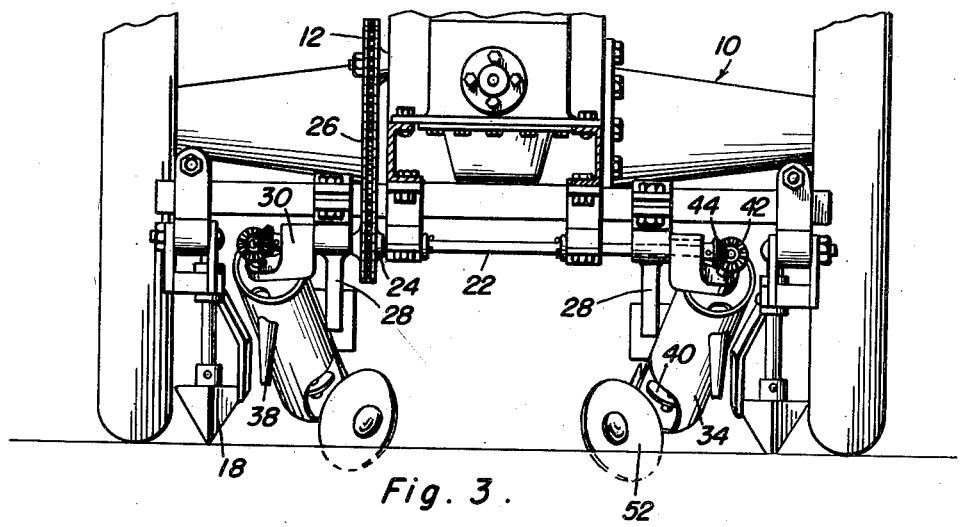
Figure 3 is a front elevational view of the arrangement of Figure 1.

Referring now more specifically to the accompanying drawings, wherein like numerals designate similar parts throughout the various views, it will be seen the numeral 10 indicates generally an agricultural cultivator which may conveniently comprise various known types of farm tractors, which may be provided with a conventional form of power take-off including a driving shaft having a sprocket drive wheel 12, by means of which the attachment forming the subject matter of this invention is driven and derives its power.

In accordance with this invention, a transversely extending implement supporting beam 14 with which the tractor is customarily equipped when functing as a agricultural cultivator, is provided with rearwardly extending frame member 16 which are provided with the customary cultivator blades 18 suitably depending therefrom and adjustably secured thereto in any desired manner, these blades constituting the conventional means by which the agricultural cultivator cultivates and works the soil about rows of crops such as peanuts or the like.

Supported by and mounted upon the forward transverse beam 14 as by means of rearwardly extending bracket supports 20 is a transversely extending shaft 22. This shaft 22 is provided with a sprocket wheel 24 which is operatively connected with the driving sprocket 12 of the power take-off of the tractor as by a sprocket chain 26. Loosely and pivotally journaled, and supported upon the extremities of the transverse shaft 22, outwardly of the supporting brackets 20, are a pair of substantially L-shaped supporting frame or hanger members 28, having upper ends 30 which are loosely journaled from the extremities of the shaft 22 and having perpendicularly extending lower extremities 32. Welded, bolted, or otherwise suitably secured to the portions 30 and 32 of the hangers 28, are the casing members 34 which may be cylindrically formed, and which as shown in Figures 1 and 3 are normally positioned at an inclination to both the vertical and horizontal planes.

Figure 4:
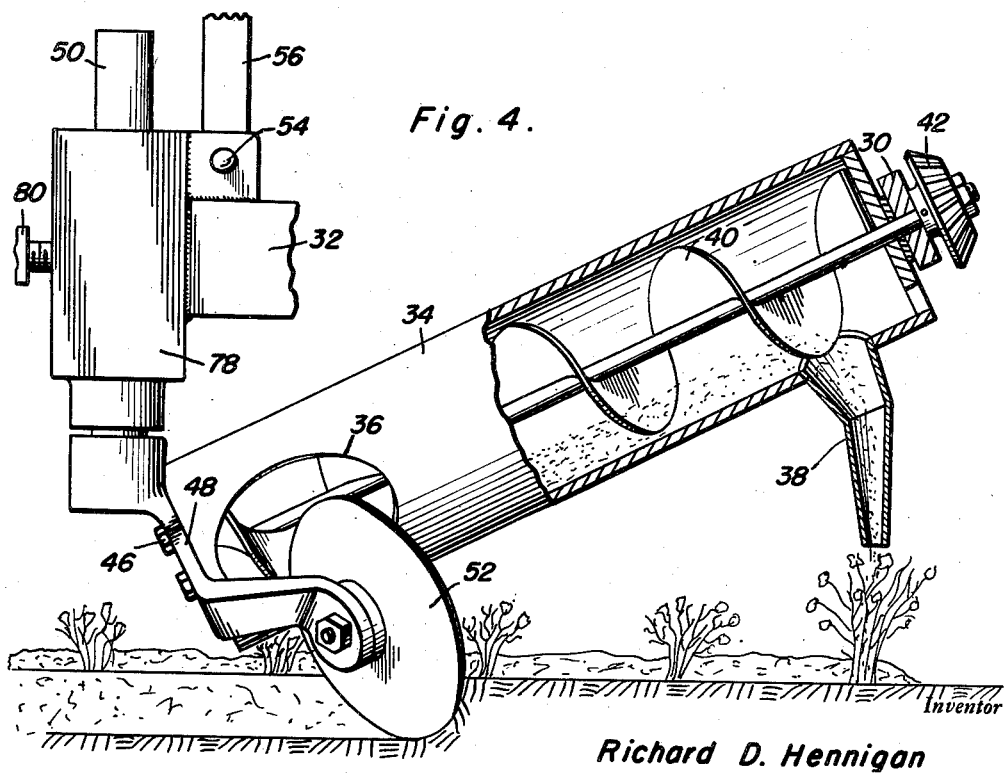
Figure 4 is an enlarged detail view in side elevation and parts being broken away, one of the elevators forming a part of the invention, and illustrating the mounting and operation of the elevator.

Since the casing 34 is rigidly secured to the hanger 28, it will be seen that the casing is pivotally supported at its upper extremity for pivotal movement about the transverse shaft 22. The casing, as shown in Figure 4 is preferably provided adjacent its lower end with an inlet opening 36, and at its upper ends provided with a discharge opening 38. Suitably journaled in the casing and extending longitudinally thereof, is a spiral conveyor or elevator screw 40, whose upper end has its axial shaft extending through the upper end of the casing, and through the bracket portion 30, and has keyed or otherwise rigidly secured thereto a bevelled gear 42 for driving the same, this bevelled gear being continuously in mesh with a corresponding bevelled gear 44 which is secured to the extreme end of the transverse shaft 22.

It will thus be seen that the elevator screw is continuously driven by the transverse shaft 22 whenever the power take-off of the tractor is energized by any suitable control means, not shown, and likewise is disposed for pivotal movement about the transverse shaft, without however interfering with its driving connection therewith. At its lower end, the elevator casing 34 is rigidly attached as by bolts or the like 46, to the middle portion 48 of a holder, which at one extremity is rigidly secured to a vertically extending adjusting and supporting shaft 50, while its other end suitably journals a disc type of plow blade 52. Preferably, the supporting arm is bent or angulated so as position the disc blade 52 at an angle both with respect to the line of motion of the tractor 10, as well as to the axis of the elevator 34, whereby the disc will break the top soil and direct the same into the inlet opening 36 of the elevator as shown clearly in Figure 4.

It is contemplated that the two elevators shall be disposed between the two crop rows being cultivated by the two sets of cultivator blades, so that the top soil which is broken by the disc 52 will be removed from a location not undergoing cultivation by the cultivator blades, thus serving to break the soil between the crop rows, deter the growth of weeds therebetween, and deliver additional top soil to the crop rows. For this purpose it is to be understood that the discharge spouts 38 are to be directed so as to discharge the soil lifted by the elevator 34 substantially upon the sides of the crop rows being cultivated by the apparatus, this additional top soil thus supplementing the soil thrown against the rows by the cultivator blades 18.

In order to adjustably pivot the elevators about their supporting transverse shaft 22, the rearward extremities of the lower portions 32 of the hangers 28 have pivotally connected thereto as at 54, supporting links 56 which at their upper extremities are pivoted as at 58 to lever 60. These levers 60 are in turn pivotally connected at their front ends to a transverse supporting and adjusting bar 62, likewise suitably carried by and journaled upon the cultivator, these levers at their rear ends being pivoted as at 64 to adjusting links 66 which are in turn hinged as at 68 to the lower arm 70 of a bellcrank 72, pivoted to the cultivator or tractor frame as at 74, and adjustably retained in different positions of adjustments as by a notched quadrant or sector plate 76. Welded or otherwise rigidly secured to the portion 32 of the hanger 28 at or adjacent its outer or rear extremity, is a vertically disposed sleeve 78 which slidably receives the rod 50, the latter being adjustably retained therein as by a set screw 80. This arrangement is such that the lower end of the elevator 34 may be vertically adjusted upon the previously described pivoting mechanism, and supported thereby. When now the bellcrank is operating, the link 66 will be raised or lowered thereby causing a pivotal movement of the lever 60, and the corresponding raising or lowering of the outer extremity 32 of the hanger 28 by means of a connecting link 56. Thus, the entire elevator assembly is pivoted upwardly or downwardly about the transverse shaft 22 to thereby regulate the extent or depth of penetration of the plow disc 52 in the top soil and consequently the amount of soil delivered by the discharge spout 38 to the road being cultivated.

From the foregoing, the construction operation of the device can be readily understood and further explanations believed to be unnecessary.

However, since numerous modifications and changes will readily occur to those skilled in the art after a consideration of the foregoing specification and accompanying drawings, it is not desired to limit the invention to the exact construction shown and described. Accordingly, all suitable modifications and equivalents are to be regarded as comprehended by the principles of this invention, within the scope of the appended claims.

Having described the invention, what is claimed as new is:

1. In combination with a cultivator including a tractor having a power take-off, a supporting frame with cultivator blades mounted thereon, a cultivator attachment comprising an elevator for moving dirt, inlet and discharge openings for said elevator, means for supporting said elevator from said frame in position for discharging dirt from said outlet upon a row of plants worked by said cultivator blades, means for operating said elevator from a power take-off of said tractor, said supporting frame including a lay shaft carried transverse the tractor, said elevator being pivoted upon said shaft and adjusting means connected with said elevator for effecting pivotal movement of the latter about the axis of said shaft, a plow blade carried by said elevator adjacent its inlet for digging soil and discharging the same into said inlet.

2. In combination with a cultivator including a tractor having a power take-off, a supporting frame with cultivator blades mounted thereon, a cultivator attachment comprising an elevator for moving dirt, inlet and discharge openings for said elevator, a bracket supporting said elevator from said frame in position for discharging dirt from said outlet upon a row of plants worked by said cultivator blades, means for operating said elevator from a power take-off of said tractor, a plow blade carried by said elevator adjacent its inlet for digging soil and discharging the same into said inlet, said supporting frame including a lay shaft carried transverse the tractor, said elevator being pivoted upon said shaft and adjusting means connected with said elevator for effecting pivotal movement of the latter about the axis of said shaft, said operating means including cooperating gearing between said shaft and said elevator and a driving connection to said shaft from the power take-off of the tractor.

3. A peanut cultivator comprising a wheeled cultivator frame, a transverse shaft and bar journaled on said cultivator frame, cultivator blades on said frame for cultivating a crop row, a dirt elevator having an upper end pivoted on said shaft and having a discharge spout for directing soil upon the crop row undergoing cultivation by said cultivator blades, support means adjustably connecting the lower end of the elevator to said bar, means for rotating said bar for pivoting the elevator about the shaft, a plow carried by the lower end of the elevator for directing soil into an inlet opening at the lower end of the elevator and means for operating said elevator.

4. A peanut cultivator comprising a wheeled cultivator frame, a transverse shaft and bar journaled on said cultivator frame, cultivator blades on said frame for cultivating a crop row, a dirt elevator having an upper end pivoted on said shaft and having a discharge spout for directing soil upon the crop row undergoing cultivation by said cultivator blades, support means adjustably connecting the lower end of the elevator to said bar, means for rotating said bar for pivoting the elevator about the shaft, a plow carried by the lower end of the elevator for directing soil into an inlet opening at the lower end of the elevator and means for operating said elevator, said last means including a driving connection for rotating said shaft and gearing connecting said shaft and said elevator for operation thereby.

RICHARD D. HENNIGAN.

REFERENCES CITED

The following references are of record in the file of this patent:

UNITED STATES PATENTS

| Number | Name | Date |
| --- | --- | --- |
| 973,402 | Barnett | Oct. 18, 1910 |
| 1,070,423 | Curtis | Aug. 19, 1913 |
| 1,960,270 | Lindgren | May 29, 1934 |
| 2,498,156 | Dodson et al. | Feb. 21, 1950 |

FOREIGN PATENTS

| Number | Country | Date |
| --- | --- | --- |
| 554,672 | Germany | July 9, 1932 |